Figure 2:
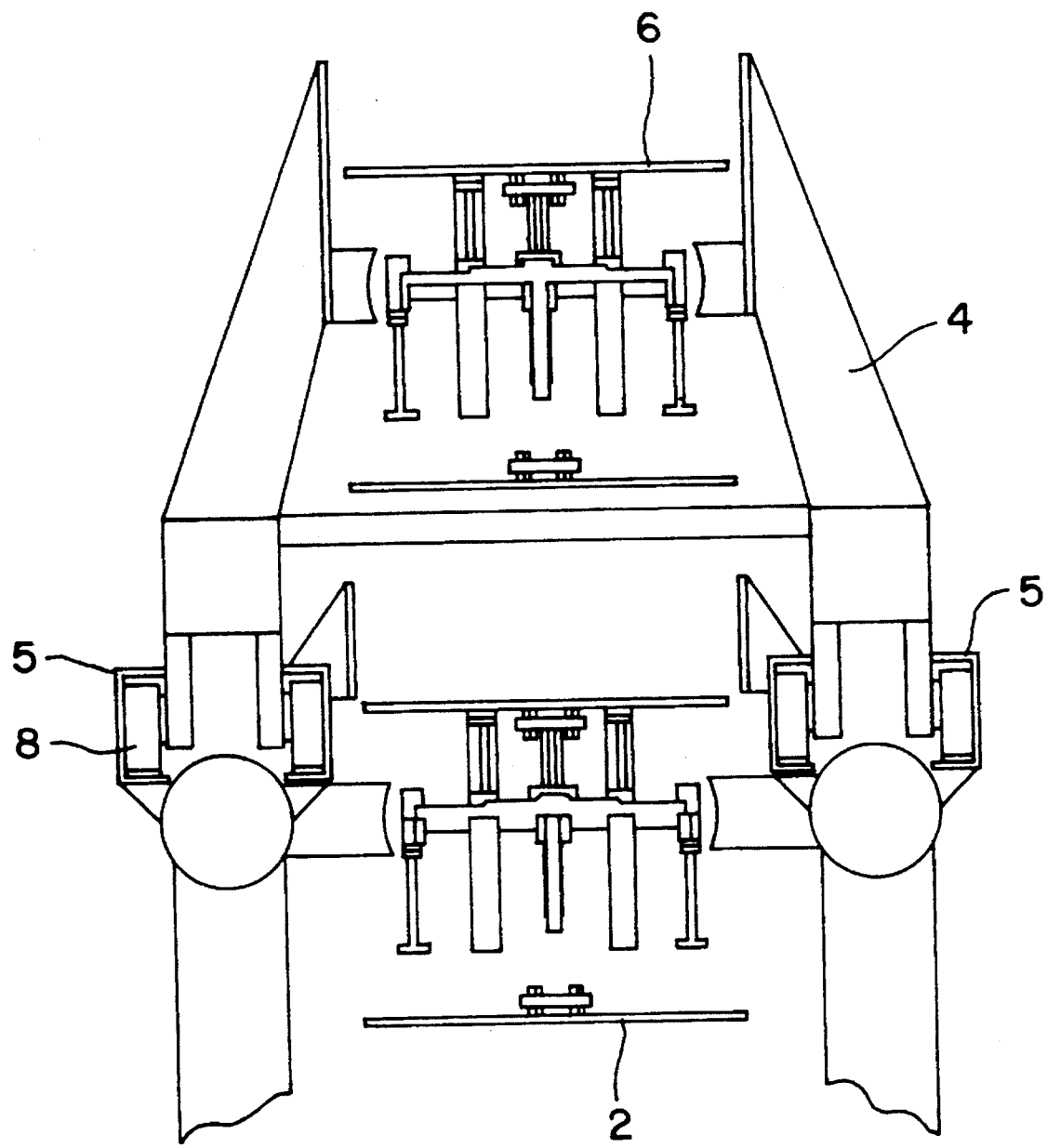

United States Patent [19]

Jordan

[11] Patent Number: 5,580,187
[45] Date of Patent: Dec. 3, 1996

[54] APPARATUS FOR LAYING AND/OR RETRIEVING ELONGATE FLEXIBLE ELEMENTS

[75] Inventor: Peter A. Jordan, Redcar, England

[73] Assignee: McDermott Subsea Constructors Limited, Aberdeen, Scotland

[21] Appl. No.: 331,507

[22] PCT Filed: Feb. 23, 1994

[86] PCT No.: PCT/GB94/00362

§ 371 Date: Oct. 20, 1994

§ 102(e) Date: Oct. 20, 1994

[87] PCT Pub. No.: WO94/19637

PCT Pub. Date: Sep. 1, 1994

[30] Foreign Application Priority Data

Feb. 24, 1993 [GB] United Kingdom ............ 9303694

[51] Int. Cl.⁶ .................. F16L 1/14; B63B 35/03
[52] U.S. Cl. .............. 405/166; 405/168.3; 405/173
[58] Field of Search .................. 405/158, 164, 405/165, 166, 168.1, 168.3, 173, 177

[56] References Cited

U.S. PATENT DOCUMENTS 4,917,540  4/1990  Recalde ................ 405/168.3
5,000,619  3/1991  Kordahi ................ 405/168.3
5,011,333  4/1991  Lanan ................... 405/166

FOREIGN PATENT DOCUMENTS 2232740  12/1990  United Kingdom .
WO93/06402  1/1993  WIPO .

Primary Examiner—William P. Neuder
Attorney, Agent, or Firm—Robert J. Edwards

[57] ABSTRACT

Apparatus for laying and/or retrieving elongate flexible elements, such as pipes and cables having accessories at spaced intervals, is mounted on a floating vessel such as a barge an comprises two self powered conveyors pivotally connected together through a hinge but which may be locked relative to one another for use. A trolley runs on wheels or rails on either side of the conveyor system and has an upper surface consisting of a further powered conveyor. The sides of the conveyor extend to form a chute at the outboard end. In normal operation the trolley is stored and the pipe or cable is carried by the conveyors to the chute which guides it into the water. The shape of the chute permits the pipe/cable to leave the barge at up to 45 degrees either side of the fore and aft axis of the conveyor. When an accessory on the pipe/cable approaches the trolley is raised to support the pipe/cable behind the accessory carrying the pipe with the accessory above and out of contact with the conveyors until the accessory has entered the water. The trolley is then retrieved.

34 Claims, 4 Drawing Sheets

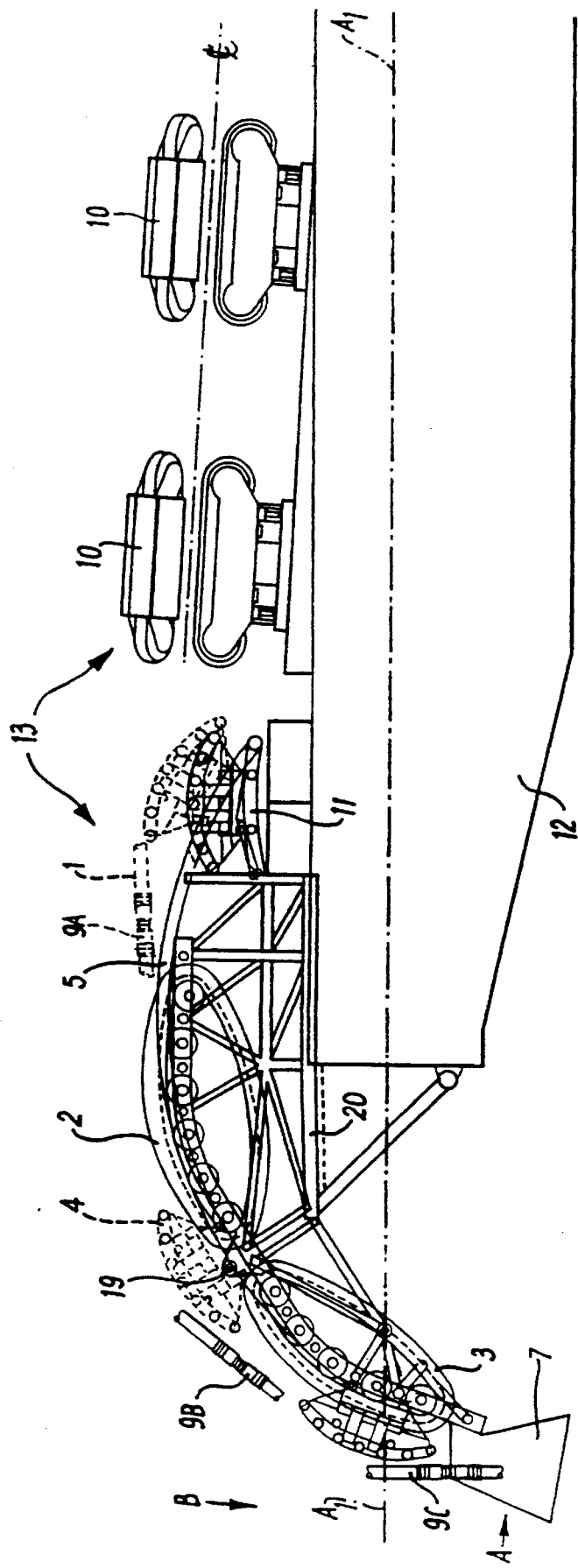
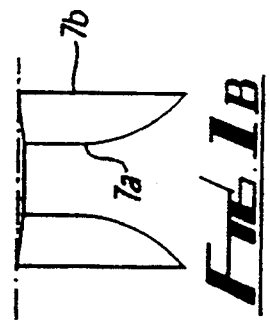
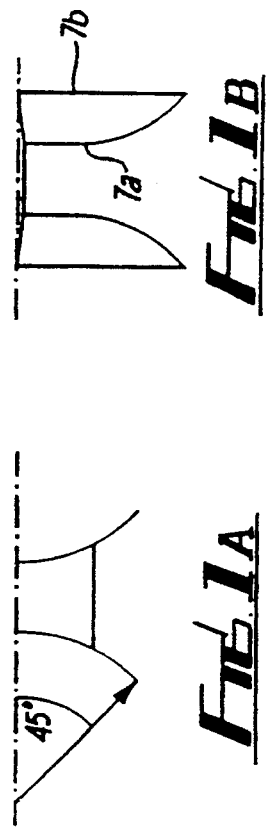

APPARATUS FOR LAYING AND/OR RETRIEVING ELONGATE FLEXIBLE ELEMENTS

This invention relates to apparatus for laying and/or retrieving elongate flexible elements and particularly, but not exclusively, to apparatus for laying and/or retrieving elongate flexible pipes or cables which have an accessory spaced at intervals along their length.

One form of apparatus for laying and/or retrieving elongate flexible pipes or cables is an arrangement mounted on and supported by a floating vessel such as a barge. Such an apparatus is adapted for laying pipes or cables in a deep sea environment and in one embodiment has a guide means positioned in order to permit a pipe or cable to pass over an edge of the vessel and means arranged to support the pipe or cable during this operation.

A problem encountered with the above mentioned apparatus was that the pipe or cable could not be bent into an arc, beyond a particular limiting radius of curvature, without damaging the pipe or cable. This was partly due to the presence of linkages or accessories which connected lengths of pipe or cable together. It was also partly due to the fact that the pipe or cable when laid or retrieved was placed under considerable tensile loads and when subject to bending this gave rise to stress concentrations, particularly at or close to accessory pipe/cable junctions. The problem of maintaining the cable in a relatively shallow arc with respect to accessories has been made more difficult by the fact that the accessories have a greater diameter than the pipe or cable. In addition to the aforementioned accessories which are integral with the pipe, secondary accessories, such as anodes for cathodic protection or bend restrictors are often fitted in the form of strings of "bracelets" around the pipe or cable adjacent to the accessory. An additional problem arises as these secondary accessories cannot be passed over the relatively small radius of the guidance means without serious risk of damage to the secondary accessories and/or the pipe/cable.

Equipment and techniques were developed to limit the stresses which occurred in an attempt to mitigate this effect of stress concentration occurring at pipe/cable accessory junctions. One such piece of equipment is described in U.K. Patent GB 2,173,760B GB 2,173,760B describes and claims a device for laying or naturally raising a pipe which comprises in one embodiment a grooved wheel of relatively large diameter. The grooved wheel is positioned at the rear of a pipe/cable laying vessel and is able to rotate about a supporting axis. A pipe/cable is curved to pass over the wheel, in the groove, and is either laid or retrieved depending upon the sense of rotation of the wheel. The radius of curvature of the grooved wheel is such that the pipe/cable is never bent beyond the limiting minimum radius of curvature.

During the laying process, pipe/cable is unwound from a storage drum or reel and passed through one or more sets of linear traction devices. These devices are similar to caterpillar type tensioners. They are sometimes known as trichenilles. They ensure that the pipe/cable is held in sufficient tension during the laying process. The pulling force by the or each set of tensioners depends on the amount of pipe which has already been paid out the water depth, and the horizontal distance between the barge and the touch down point of the pipe/cable on the sea bed. During the pipe/cable retrieving stage the process is effectively reversed.

So as to enable the accessories to be passed without damage over the edge of the barge or vessel during the laying (or retrieving) process the system described in GB 2,173,760B incorporates a handling device, known as a gantry arrangement, which is pivotally linked to the supporting axis and is able to rotate thereon and independent of the grooved wheel. The purpose of the gantry is to engage the accessory which is fitted with trunnions.

Engagement of the trunnions occurred at an instant just as an accessory "approached" the supporting wheel. The gantry was then urged against the accessory by the pipe tension and a portion of the pipe/cable proximal thereto was raised. The diameter of the grooved wheel and locus on which the gantry moved were substantially parallel. The motion of the gantry is controlled by ropes or hydraulic machinery so that the tension in the pipe/cable is resisted by the gantry instead of by the tracked tensioners.

Bearings mounted on the trunnions permitted pivotal motion of the accessory relative to the gantry, with the result that tension in the pipe/cable was resisted in the bearing and that pipe/cable "behind" the bearing was gradually subjected to less and less axial tension. This axial load on the bearing decreased as the accessory was rotated through approximately one right angle. Tension "in front" of the bearing gradually increased. The gantry was then removed and cable/pipe again paid out until the next accessory had to be overboarded.

The aforementioned apparatus although generally successful, however, suffered from some disadvantages. The mid-line joints do not normally have suitable trunnions for engagement with the gantry and these have to be fitted by means of temporary clamps. The fitting of clamps and particularly their removal underwater delays the operation of laying the pipe/cable. Additionally the design of the pipe/cable frequently incorporates further secondary accessories such as cathodic protection anodes and/or bend restrictors which are mounted loosely on the outside of the pipe and like strings of "bracelets". These secondary accessories cannot be fitted with trunnions and the length of the total assembly is too great for it to be handled using the gantry. These further accessories cannot, while the pipe/cable is under tension, be safely passed over the small radius guidance wheel. These secondary accessories have to be handled overboard by other means such as a clamp fitted to the pipe/cable ahead of the string of accessories the clamp having trunnions to enable it to be supported by wire ropes from the gantry. The fitting and subsequent subsea removal of clamps is a time consuming and therefore expensive operation. The time taken to fit clamps adds to the risk of the operation if the pipe/cable has to be abandoned due to bad weather.

Copending U.K. Patent Application No. 92243567 describes apparatus for laying and/or retrieving elongate flexible elements for overcoming the aforementioned disadvantages and this present invention relates to an improvement of the latter apparatus.

According to the present invention there is provided apparatus for laying or retrieving an elongate flexible element comprising at least one conveyor arranged to support the element and a trolley arranged to support the element ahead or behind an accessory integral with the element said trolley being adapted to move in such a manner that at least a portion of a path followed by the trolley is substantially parallel to a path followed by the element supported by the conveyor and and characterised by a chute disposed adjacent the conveyor to maintain the element in line with the conveyor.

In a preferred embodiment of the invention the or each conveyor may comprise an endless belt or belts and the endless belt or belts may be free to move or have propulsion means. The or each endless belt is preferably made of a chain or chains supported on rollers. Pads are bolted on each chain link which, when in contact, allow the endless belt to be in the shape of an arc of a circle. In this way the elongate flexible element may lie on a curved surface having a constant radius, while sustaining its uniform load due to bending and tension.

The or each endless belt may roll evenly on supporting rollers, minimizing the rolling friction since rollers may run on a cylindrical surface. The use of a fully articulated belt (such as a chain or a continuous belt) would concentrate the bending or pipe/cable just over the supporting rollers, with evident problems of pipe/cable stress and increase of rolling friction encountered by belt over rollers because of its flexing.

The trolley is in the form of a saddle having a radius of curvature of less than the radius of curvature of the endless belt which engages the pipe/cable at a position behind the accessory so that the pipe/cable is held in an arc of substantially constant radius of curvature. Such radius being smaller than the radius of curvature adopted by the pipe/cable over the or each endless belt. In this invention the saddle on the trolley is a conveyor which may be powered. Ahead of the accessory the pipe/cable is laid on the surface of the belt in an arc of substantially constant radius of curvature. The trolley in fact supports the accessory and pipe/cable in such a manner that its position relative to the surface of the endless belt is fixed. Thus although pipe/cable is being overboarded it is always moving at the same velocity with respect to the accessory. The accessory can thus be overboarded without damage and with the pipe/cable under tension and without the time consuming and difficult task of fitting and removing clamps with trunnions or other means of taking up the pipe tension. This was not the case with the overboarding arrangement described in the above patent. Any bending moments on the pipe/cable will be absorbed in the bulk of the pipe/cable where greater bending is permissible without any damage occurring.

The trolley can be arranged to run on tracks or rails. These may be arranged such that the trolley may be stopped when the elongate flexible element with its accessory is positioned substantially vertically with respect to the surface of the sea. The flexible element laying then continues while it passes over the main conveyors and the trolley conveyor. As soon as the accessory or accessories are overboard and clear of the chute the trolley is recovered to its stowage position by powering it up under the flexible element.

According to a second aspect of the present invention there is provided apparatus for laying and/or retrieving a cable or pipe comprising a first moveable cable or pipe support and a second moveable cable or pipe support, the first and second supports being arranged such that a cable or pipe may pass thereover, the first support being pivotally connected to the second support characterised by a chute disposed adjacent one of the supports to maintain the cable or pipe in line with the support.

Advantageously the supports comprise endless belts. When it is required to lay two or more parallel pipes or cables further pairs of belts may be placed parallel to each other to enable the independent laying of the several pipes or cables. More than one pipe and/or cable may however be laid over a single line of conveyors. Means may be positioned before the first moveable surface and/or between the first moveable surface and the second moveable surface in order to be able to hold the tension in the pipe/cable(s) independent of the tensioners.

The pairs of surfaces are supported on a series of rollers similar to a conveyor belt. The surfaces may be metal plates with or without a coating of elastomeric material or may be made wholly of elastomer or synthetic rubber. When in use the two pairs of moveable surfaces, which have an arcuate profile, are positioned such that they define portions of the perimeter of a circle. It is across these surfaces that cable or pipe passes as it is being laid or retrieved. The second surface in use lies partly below sea level and is hereinafter referred to as the lower surface. Hydraulic rams or winch or crane operated wires are provided for pivoting the lower surface to a point where it can be lifted out of the sea. This enables the pipe or cable laying vessel to enter shallow ports without fear of damages occurring to the lower support whilst the vessel is at sea.

Each moveable surface is supported on a steel frame. When in the working and maintenance position, structure supporting the lower surface may be safely locked by mechanical or hydraulic means. Rollers supporting the or each endless belt may be freely rotating or some may be driven. The force required to be applied by the pipe/cable to the endless belt is such that the effective coefficient of friction between the belt and a pipe or cable passing thereover is low enough to prevent damage to the pipe/cable by friction.

Figure 3:
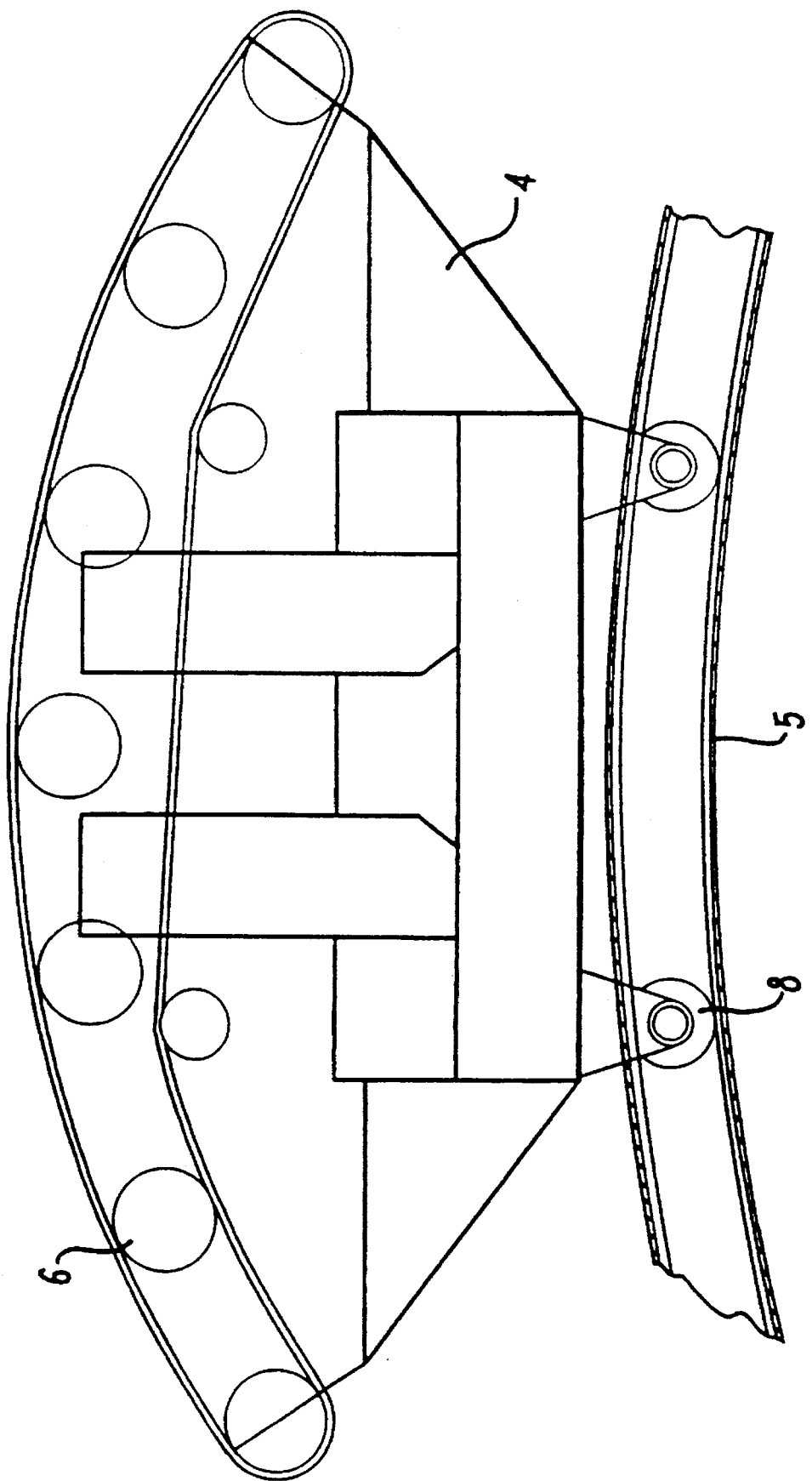
Figure 4:
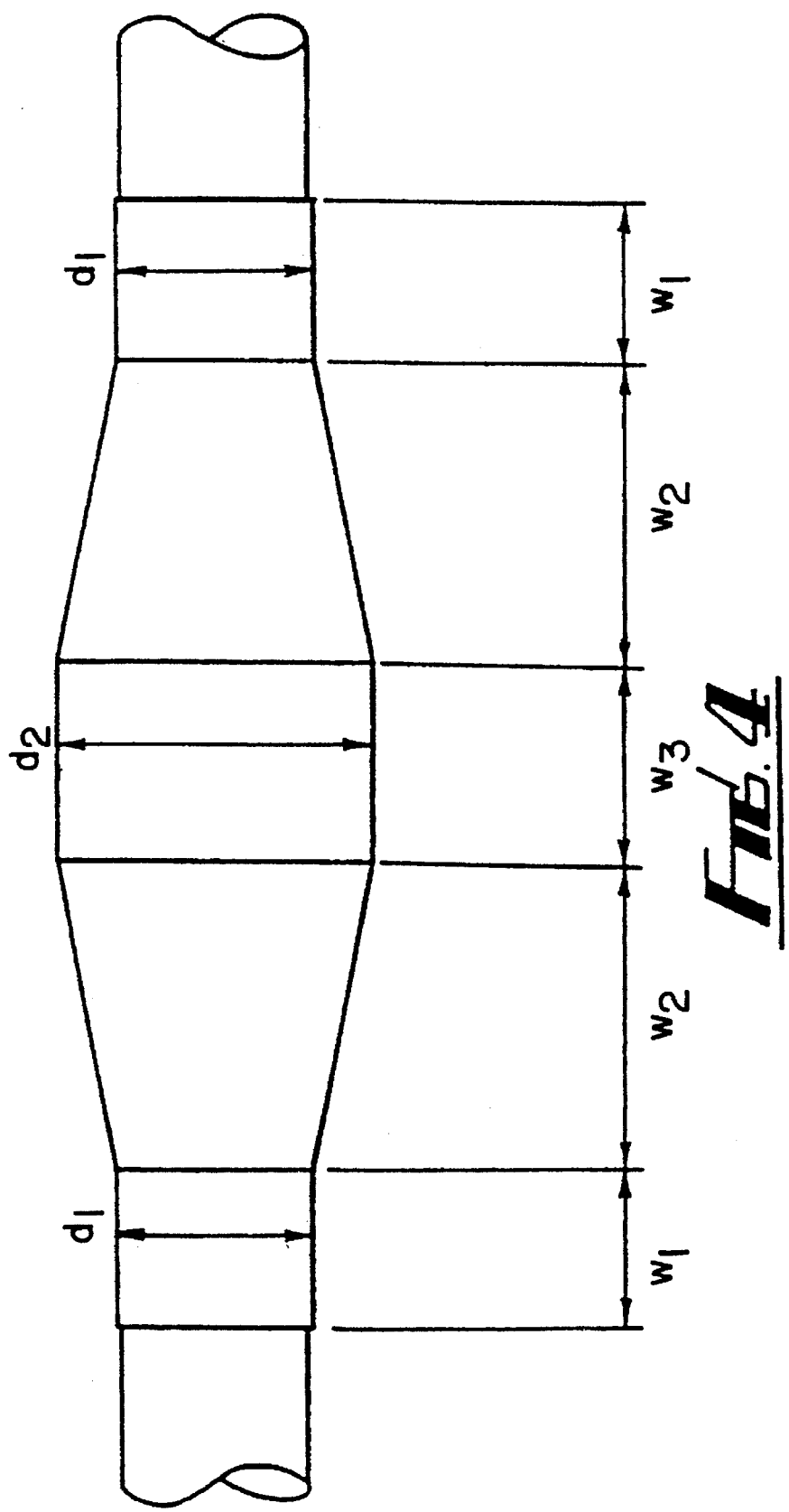

An embodiment of the invention will now be described, by way of example only, and with reference to the Figures in which:

FIG. 1 is a diagrammatic side elevational partial view of a barge with a pipe laying and/or retrieving apparatus;

FIG. 1A is a view taken in the direction of arrow A in FIG. 1 of a chute forming part of the apparatus, FIG. 1B is a view taken in the direction of arrow B in FIG. 1 of a chute forming part of the apparatus of FIG. 1, FIG. 2 is a diagrammatic section through part of the apparatus of FIG. 1, FIG. 3 is a diagrammatic side elevational view of the part of the apparatus shown in FIG. 2, and FIG. 4 is a diagrammatic side elevational view of an accessory integral with the element.

Referring to FIGS. 1, 1A and 1B an apparatus 13 for laying and/or retrieving a pipe 1 is shown generally on a barge 12. A centreline of a pipe 1 is shown passing through two sets of tensioners 10. These act to restrain the pipe 1 from running away as it is being paid out. An accessory is shown in various positions and for ease of reference these will be referred to as 9A, 9B and 9C. The sea level is indicated by broken chain line $A_1$—$A_1$.

The apparatus comprises two conveyors 2 and 3 which provide a curved support surface over which a pipe passes into the sea. The pipe is bent significantly less than the minimum allowable bend radius. The surface of each conveyor is provided by a flat segmental belt, which in this example is 1100 mm wide, formed of steel plates which may be surfaced with polyurethane or other suitable elastomer. The first conveyor 2 is in a fixed position relative to the vessel 12. The second conveyor 3 however is able to pivot with respect to the first conveyor about a hinge 19. A locking frame 20 supports the apparatus 13 and is permanently connected to the vessel 12. A or mechanical hydraulic latching jack (not shown) locks the first and second conveyors relative to one another. When locked they are ready for use.

The conveyors are self powered by a hydraulic system which can be set so that it just fails to overcome the friction in the system. The conveyor will thus move in the direction of travel of the flexible element with minimal axial force applied by the flexible element, in the direction of motion. The effective coefficient of friction is thus zero. The power system on the conveyors 2,3 is arranged so that they automatically adopt the same direction of travel as the tensioners 10. In the event of any failure of the hydraulic drive system, the conveyors will free wheel and are designed to have an effective coefficient of friction, in those circumstances, of <0.1. The large radius of curvature of the pipe over the conveyors enables accessories mounted around the pipe, such as bend restrictors or bracelet anodes, to be passed overboard, resting on the conveyors, without damage and with the product under tension. When a mid-line joint or similar accessory has to be over boarded, it has to be supported so that the product at each end of the accessory is not subject to bending. This is effected by the use of a trolley 4 which runs on wheels 8 on rails 5 on either side of the conveyor system. The trolley 4 has an upper surface consisting of a further conveyor 6 which is again powered to provide an effective coefficient of friction of zero. The radius of curvature of the trolley conveyor less than that of the main conveyor but more than the minimum allowable bend radius of the elongate flexible element. The trolley is electrically or hydraulically driven in either direction along the track. The trolley may be engaged with the pipe by raising a hydraulically actuated rail section II. The mid line accessories typically have an envelope of permitted dimensions as shown in FIG. 4 where, in this example, $d_1$ is 500 mm, $d_2$ is 800 mm $w_1$ is 400 mm, $w_2$ is 770 mm, and $w_3$ is 500 mm. During transit, or for maintenance of the outer conveyor, the outboard section can be hinged up abut pin 19 for access. The sides of the conveyor are steel plates which extend to form a square bell-mouth chute 7 at and beyond the outboard end. The bell-mouth has a minimum radius larger than the allowable minimum bend radius of the flexible product and allows the product to leave at up to 45° either side of the fore and aft axis of the conveyor system as shown in FIG. 1. The side and top edges of the chute are shaped as indicated in FIG. 1A and 1B respectively.

When not in use the trolley 4 is stowed at the upper end of the system, lowered below the pipe on the hinged rail section II. In this position there is clearance for the pipe and the mid line accessories to pass over the trolley 4 without contact. When the mid-line accessory has passed through the tensioners 10, it is stopped just before the first conveyor 2. The trolley 4 is raised by the hydraulically powered, hinged rail section II to support the pipe behind the accessory. The elongate flexible element I and trolley 4 then move together until the trolley reaches the outer end of the rail. In FIG. 1, 9A, 9B and 9C show successive positions of the mid-line accessory. When the trolley reaches the outer end of its travel 9C, the trolley is stopped and the pipe laid ahead until the accessory is clear of the overboarding system. The trolley is then retrieved to its inboard position by powering back along the rail with the pipe on its conveyor. Access walkways are provided along the sides of the conveyors. To permit the installation of end fittings on the product, means are provided before the first conveyor 2 and between first and second conveyors to stop the pipe off using a clamp fitted to the pipe and a support plate with a slot to pass over the product.

If recovery of a mid-line accessory or end fitting is required, the trolley 4 can be driven out to the end of the conveyor 3 by hydraulic power. The recovery operation is then the reverse of the overboarding method described above.

With the above embodiment there is:

low risk of damage to pipe due to very low effective friction and large curvature, Mid-line accessories may be overboarded under tension but without any contact with the system. This saves time and is safer for the pipe and the operators than systems relying on clamps.

The large radius of curvature allows accessories such as bend restrictors and bracelet anodes to be handled without risk of damage.

Horizontal arrangement of the pipe gives convenient working space between and astern of the tensioners for attachment of anodes and other accessories.

The overboarding system operates with a minimum of moving parts below water. The guide chute enables the flexible element to be safely retained in position on the conveyor even with severe vessel motions and if the vessel is obliged by prevailing sea conditions to proceed on a heading at an angle to the line of lay.

It will be appreciated that the above embodiment has been described by way of example only and that many variations are possible without departing from the scope of the invention.

I claim:

1. Apparatus for laying or retrieving an elongate flexible element comprising at least one conveyor arranged to support the element and a trolley arranged to support the element ahead or behind an accessory integral with the element said trolley being adapted to move in such a manner that at least a portion of a path followed by the trolley is substantially parallel to a path followed by the element supported by the conveyor and characterised by a chute disposed adjacent the conveyor to maintain the element in line with the conveyor.

2. Apparatus as claimed in claim 1, in which each conveyor comprises at least one endless belt.

3. Apparatus as claimed in claim 2, in which each endless belt may be free to move or have propulsion means.

4. Apparatus as claimed in claim 2, in which each endless belt is made of at least one chain supported on rollers, each chain further comprising a plurality of chain links.

5. Apparatus as claimed in claim 4, in which each of a plurality of pads are bolted on each chain link and when each pad is in contact with each adjacent pad, the endless belt is in the shape of an arc of a circle.

6. Apparatus as claimed in claim 1, in which the trolley is in the form of a saddle having a radius of curvature less than the radius of curvature of the conveyor arranged to support the element at a position behind the accessory so that the element is held in an arc of substantially constant radius of curvature.

7. Apparatus as claimed in claim 6, in which the trolley comprises a conveyor which is powered.

8. Apparatus as claimed in claim 7, in which the trolley is arranged to run on one of tracks and rails.

9. Apparatus for laying and/or retrieving a cable or pipe comprising a first moveable cable or pipe support and a second moveable cable or pipe support, the first and second supports being arranged such that a cable or pipe may pass thereover, the first support being pivotally connected to the second support characterised by a chute disposed adjacent one of the supports to maintain the cable or pipe in line with the support.

10. Apparatus as claimed in claim 9, in which the supports comprise endless belts.

11. Apparatus as claimed in claim 10, in which additional belts are placed substantially parallel to each other to enable independent laying of a plurality of pipes or cables.

12. Apparatus as claimed in claim 9, in which means are disposed between the first and second supports operative to maintain tension in the pipe or cable.

13. Apparatus as claimed in claim 9, in which the supports are disposed on a series of rollers.

14. Apparatus as claimed in claim 9, in which the surfaces of the supports are one of: coated with elastomeric material, made wholly of elastomer, and made wholly of synthetic rubber.

15. Apparatus as claimed in claim 9, in which the first and second supports have an arcuate profile and are positioned in operation so that they form part of the perimeter of a circle.

16. Apparatus as claimed in claim 9, in which means are provided for pivoting a lower one of the two supports to a point where, in operation, the lower of the two supports may be lifted.

17. Apparatus as claimed in claim 16, in which the means comprise a hydraulic ram.

18. Apparatus as claimed in claim 16, in which the means comprises one of winch and crane operable wires.

19. Apparatus as claimed in claim 3, in which each endless belt is made of at least one chain supported on rollers, each chain comprising a plurality of chain links.

20. Apparatus as claimed in claim 19, in which each of a plurality of pads are bolted on each chain link and when each pad is in contact with each adjacent pad, the endless belt is in the shape of an arc of a circle.

21. Apparatus as claimed in claim 20, in which the trolley is in the form of a saddle having a radius of curvature less than the radius of curvature of the conveyor arranged to support the element at a position behind the accessory so that the element is held in an arc of substantially constant radius of curvature.

22. Apparatus as claimed in claim 21, in which the trolley comprises a conveyor which is powered.

23. Apparatus as claimed in claim 22, in which the trolley is arranged to run on one of: tracks and rails.

24. Apparatus as claimed in claim 12, in which the supports are disposed on a series of rollers.

25. Apparatus as claimed in claim 24, in which the surfaces of the supports are coated with one of: elastomeric material, made wholly of elastomer, and made wholly of synthetic rubber.

26. Apparatus as claimed in claim 25, in which the first and second supports have an arcuate profile and are positioned in operation so that they form part of the perimeter of a circle.

27. Apparatus as claimed in claim 26, in which means are provided for pivoting a lower one of the two supports to a point where, in operation, the lower of the two supports may be lifted.

28. Apparatus as claimed in claim 27, in which the means comprises a hydraulic ram.

29. Apparatus as claimed in claim 28, in which the means comprises one of: winch and crane operable wires.

30. An apparatus for laying and retrieving a pipe or cable having at least one appliance along its length, the apparatus comprising:

a first support frame having first conveying means for passing the pipe or cable thereover;

a second support frame, pivotally connected to the first support frame, the second support flame having second conveying means for passing the pipe or cable thereover, the first and second support frames positioned such that they form an arc;

a chute attached to an end of the second support frame for maintaining a angle defined by the pipe or cable and a vertical axis in a range of −45 to 45 degrees; and a trolley having a moveable support surface, the trolley being provided on guiding means for guiding the trolley substantially parallel to the arc formed by the first support frame and the second support frame, such that the support surface of said trolley is a greater radial distance away from each of the first and second support frames than the first and second conveying means, the guiding means being attached to the first and second support frames, the moveable support surface of the trolley being for supporting a section of pipe or cable one of ahead and behind each appliance along the guiding means between a point adjacent an end of the first support frame and the chute.

31. The apparatus according to claim 30, wherein the moveable support surface of the trolley comprises at least one endless belt.

32. The apparatus according to claim 31, wherein the endless belt is one of: free to move and provided with propulsion means.

33. The apparatus according to claim 32, wherein the guiding means comprises one of: tracks and rails.

34. The apparatus according to claim 33, wherein the second support frame is provided with lifting means for raising the end of the second support frame attached to the chute.

* * * * *